(12) United States Patent
Brand et al.

(10) Patent No.: US 8,247,037 B2
(45) Date of Patent: Aug. 21, 2012

(54) USE OF POLYSILAZANES FOR COATING METAL STRIPS

(75) Inventors: Stefan Brand, Hirschberg-Leutershausen (DE); Andreas Dierdorf, Hofheim (DE); Hubert Liebe, Wiesbaden (DE); Andreas Wacker, Mannheim (DE)

(73) Assignee: AZ Electronic Materials (Luxembourg) S.a.r.L., Luxembourg (LU)

( * ) Notice: Subject to any disclaimer, the term of this patent is extended or adjusted under 35 U.S.C. 154(b) by 911 days.

(21) Appl. No.: 11/667,654

(22) PCT Filed: Oct. 25, 2005

(86) PCT No.: PCT/EP2005/011426
§ 371 (c)(1), (2), (4) Date: May 11, 2007

(87) PCT Pub. No.: WO2006/050813
PCT Pub. Date: May 18, 2006

(65) Prior Publication Data
US 2008/0014461 A1    Jan. 17, 2008

(30) Foreign Application Priority Data
Nov. 12, 2004  (DE) .......................... 10 2004 054 661

(51) Int. Cl.
*B05D 3/02* (2006.01)

(52) U.S. Cl. .................. 427/388.2; 427/388.5; 427/409; 427/515; 427/517; 427/518; 427/521

(58) Field of Classification Search .................. 428/450; 427/388.2, 388.5, 409, 515, 517, 518, 521
See application file for complete search history.

(56) References Cited

U.S. PATENT DOCUMENTS

| | | | |
|---|---|---|---|
| 4,929,704 A | 5/1990 | Schwark | |
| 5,032,649 A | 7/1991 | Schwark | |
| 5,344,907 A | 9/1994 | Schwark | |
| 5,464,918 A | 11/1995 | Schwark | |
| 6,329,487 B1 | 12/2001 | Abel et al. | |
| 6,534,184 B2 | 3/2003 | Knasiak et al. | |
| 6,627,559 B2 | 9/2003 | Shindo | |
| 6,652,978 B2 | 11/2003 | Lukacs, III et al. | |
| 6,756,469 B2 | 6/2004 | Lukacs, III | |
| 7,622,157 B2 * | 11/2009 | Falk et al. | 427/407.1 |
| 2002/0034885 A1 | 3/2002 | Shindo | |
| 2003/0157391 A1 * | 8/2003 | Coleman et al. | 429/34 |
| 2005/0279255 A1 | 12/2005 | Suzuki et al. | |
| 2006/0246221 A1 | 11/2006 | Falk et al. | |
| 2007/0116968 A1 | 5/2007 | Dierdorf et al. | |

FOREIGN PATENT DOCUMENTS

| | | |
|---|---|---|
| DE | 10320180 | 6/2004 |
| WO | WO 2004/039904 | 5/2004 |
| WO | WO 2004/094531 A1 * | 11/2004 |

OTHER PUBLICATIONS

PCT International Search Report for PCT/EP 2005/011426, filed May 23, 2007.
U.S. Appl. No. 11/791,550 by Brand et al., filed May 23, 2007.
U.S. Appl. No. 10/591,573, Brand et al., filed Sep. 1, 2006.
U.S. Appl. No. 10/591,623 by Brand et al., filed Sep. 1, 2006.
Machine English Translation of JP 2001172795, Jun. 26, 2006.
English Translation of PCT International Preliminary Report on Patentability for PCT/EP2005/011426, Jul. 12, 2007.

* cited by examiner

*Primary Examiner* — Dhirajlal S Nakarani
(74) *Attorney, Agent, or Firm* — Sangya Jain

(57) ABSTRACT

A coating for metals containing a polysilazane solution or a mixture of polysilazanes of the general formula (I)

$$-(SiR'R''-NR''')_n- \quad (1)$$

wherein R', R'' and R''' are identical or different and independently represent hydrogen or an optionally substituted alkyl, aryl, vinyl or (trialkoxysilyl)alkyl radical, wherein n is a whole number and n is dimensioned in such a way that the polysilazane has a number-average molecular weight of 150 to 150 000 g/mol, in a solvent and at least one catalyst. The invention also relates to a method for the production of the coating.

3 Claims, No Drawings

USE OF POLYSILAZANES FOR COATING METAL STRIPS

The present invention relates to the use of polysilazanes for coating metal strips by the coil coating process.

Thin metal strips, made for example of aluminum, steel or zinc, are usually coated by the process known as coil coating. In this process, coating, materials are applied via rolls or by spraying to the metal strip ("coil"), the coating material is heat-cured in a drying section, and the coated strips are subsequently rolled up.

The requirements imposed on such coating materials are, primarily, high mechanical deformability, since the metal strips are machined and brought into their subsequent form only after coating, and rapid curing of the coating material at high temperatures, since the strips are run at high speed through the coil coating installations. Curing takes place typically at oven temperatures of 200-350° C., the PMT (peak metal temperature) attained being around 160-260° C. (Römpp Lexikon Lacke and Druckfarben, Georg Thieme Verlag, Stuttgart, 1998).

The coating materials usually used in coil coating are composed of organic binder systems such as, for example, polyester resins, epoxy resins, acrylic resins, polyurethane resins or fluorocarbon resins; in some cases, two different coating materials must be used, as primer and as topcoat, in order to allow the requirements (particularly in respect of the corrosion resistance of the coating) to be met.

One disadvantage of the known coating materials is their weathering stability, which because of their organic nature is limited, with the consequence that, particularly in the case of outdoor applications, the binder matrix breaks down over time.

A further disadvantage of the known coating systems is their low scratch resistance, since the coatings are to be as flexible as possible in order to allow the metal strip to be processed.

The chemical resistance of the conventional binder systems, too, leaves something to be desired when they are in contact with solvents or with acidic or alkaline substances, such as occurs in the case of outdoor applications as a result, for example, of acid rain or of soiling by bird droppings.

From the literature it is known that polysilazane coatings are able to protect metals against corrosion; to date, however, the only coating processes disclosed have been those in which curing must be carried out over a relatively long period of time, and which are hence not suitable for the coil coating process.

JP2001 172 795 describes the surface sealing of anodized aluminum with a polysilazane, which by treatment at high temperature is converted to a silicon dioxide film. In Example 1 aluminum is spray-coated with an unspecified polysilazane, then dried at 80° C. for 30 minutes and subsequently calcined at 400° C. for 2 hours. This laborious curing procedure and the high temperature make the process unsuitable for coil coating.

U.S. Pat. No. 6,627,559 teaches the use of a coating system comprising polysilazanes which ensure corrosion control. The system in question has at least two layers, which comprise different mixtures of polysilazanes. It is important there to tailor the mixing ratio of the polysilazanes to the layer structure in order to obtain crack-free coatings. In the examples described the layers are applied by spin coating to steel disks and, after one layer has been applied, curing takes place at 300° C. for 1 hour. A process of this kind is unsuitable for the rapid coating of metals by coil coating, since on the one hand the cure time is too long and on the other hand a multiple pass through the coating installation would be needed.

WO 2004/039 904 describes the use of a polysilazane solution for coating a variety of substrates. Included in this, in Examples 7 to 13, is the production of a corrosion control layer on aluminum. The polysilazane solution is applied by flooding and the coating is cured by heating at 120° C. for 1 hour. Accordingly this process is not suitable for use for the coil coating of metal strips.

It was an object of the present invention to develop a coating for the coil coating process that affords very good corrosion control, is highly resistant to light and weathering and, furthermore, prevents the scratching of the metal.

Surprisingly it has now been found that high-quality coil coatings can be produced using polysilazanes by means of short curing at high temperatures, these coatings being very hard and yet sufficiently flexible and exhibiting, even under mechanical stress, very good adhesion to the metal strip, and so meeting these requirements.

The invention accordingly provides a coating for coating metals, comprising a solution of a polysilazane or a mixture of polysilazanes of the formula 1

$$—(SiR'R''—NR''')_n— \quad (1)$$

where R', R'' and R''' are identical or different and independently of one another are hydrogen or an unsubstituted or substituted alkyl, aryl, vinyl or (trialkoxysilyl)alkyl radical, n being an integer and being such that the polysilazane has a number-average molecular weight of 150 to 150,000 g/mol, in a solvent and at least one catalyst.

Particularly suitable are polysilazanes in which R', R'' and R''' independently of one another are a radical from the group consisting of hydrogen, methyl, ethyl, propyl, isopropyl, butyl, isobutyl, tert-butyl, phenyl, vinyl, 3-(triethoxysilyl)propyl, and 3-(trimethoxysilyl)propyl.

In one preferred embodiment perhydropolysilazanes of the formula 2 are used for the coating of the invention

$$(2)$$

where n is an integer and is such that the polysilazane has a number-average molecular weight of 150 to 150,000 g/mol and comprises a solvent and a catalyst.

In another preferred embodiment the coating of the invention comprises polysilazanes of the formula (3)

$$—(SiR'R''—NR''')_n—(SiR'R^{}—NR^{*})_p— \quad (3)$$

where R', R'', R''', R*, R, and R* independently of one another are hydrogen or an unsubstituted or substituted alkyl, aryl, vinyl or (trialkoxysilyl)alkyl radical, n and p being integers and n being such that the polysilazane has a number-average molecular weight of 150 to 150,000 g/mol.

Particular preference is given to compounds in which
R', R''', and R*** are hydrogen and R'', R*, and R** are methyl;
R', R''', and R*** are hydrogen, R'' and R* are methyl, and R** is vinyl;
R', R''', R*, and R* are hydrogen and R'' and R are methyl.

Preference is likewise given to using polysilazanes of the formula (4)

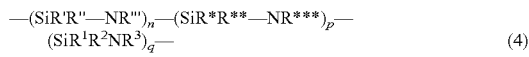

(4)

where R', R'', R''', R*, R, R*, R$^1$, R$^2$, and R$^3$ independently of one another are hydrogen or an unsubstituted or substituted alkyl, aryl, vinyl or (trialkoxysilyl)alkyl radical, n, p and q being integers and n being such that the polysilazane has a number-average molecular weight of 150 to 150,000 g/mol.

Particular preference is given to compounds in which R', R''', and R*** are hydrogen, R'', R*, R**, and R$^2$ are methyl, R$^3$ is (triethoxysilyl)propyl and R$^1$ is alkyl or hydrogen.

In general the fraction of polysilazane in the solvent is 1% to 50% by weight polysilazane, preferably 3% to 30% by weight, more preferably 5% to 20% by weight.

Suitable solvents for the polysilazane formulation include particularly organic solvents which contain no water and no reactive groups (such as hydroxyl or amine groups). These are, for example, aliphatic or aromatic hydrocarbons, halogenated hydrocarbons, esters such as ethyl acetate or butyl acetate, ketones such as acetone or methyl ethyl ketone, ethers such as tetrahydrofuran or dibutyl ether, and also mono- and polyalkylene glycol dialkyl ethers (glymes), or mixtures of these solvents.

A further constituent of the polysilazane formulation may be additives, which, for example, influence formulation viscosity, substrate wetting, film formation, or evaporation behavior, or inorganic nanoparticles such as $SiO_2$, $TiO_2$, ZnO, $ZrO_2$ or $Al_2O_3$, for example.

The catalysts used may for example be organic amines, acids, or metals or metal salts, or mixtures of these compounds.

The catalyst is used preferably in amounts of 0.001% to 10%, in particular 0.01% to 6%, more preferably 0.1% to 3%, based on the weight of the polysilazane.

Examples of amine catalysts are ammonia, methylamine, dimethylamine, trimethylamine, ethylamine, diethylamine, triethylamine, n-propylamine, isopropylamine, di-n-propylamine, diisopropylamine, tri-n-propylamine, n-butylamine, isobutylamine, di-n-butylamine, diisobutylamine, tri-n-butylamine, n-pentylamine, di-n-pentylamine, tri-n-pentylamine, dicyclohexylamine, aniline, 2,4-dimethylpyridine, 4,4-trimethylenebis(1-methylpiperidine), 1,4-diazabicyclo[2.2.2]octane, N,N-dimethylpiperazine, cis-2,6-dimethylpiperazine, trans-2,5-dimethylpiperazine, 4,4-methylenebis(cyclohexylamine), stearylamine, 1,3-di(4-piperidyl)propane, N,N-dimethylpropanolamine, N,N-dimethylhexanolamine, N,N-dimethyloctanolamine, N,N-diethylethanolamine, 1-piperidineethanol, and 4-piperidinol.

Examples of organic acids are acetic acid, propionic acid, butyric acid, valeric acid, and caproic acid.

Examples of metals and metal compounds as catalysts are palladium, palladium acetate, palladium acetylacetonate, palladium propionate, nickel, nickel acetylacetonate, silver powder, silver acetylacetonate, platinum, platinum acetyl acetonate, ruthenium, ruthenium acetylacetonate, ruthenium carbonyls, gold, copper, copper acetylacetonate, aluminum acetylacetonate, and aluminum tris(ethyl acetoacetate).

Depending on the catalyst system used the presence of moisture or of oxygen may play a part in connection with the curing of the coating. For instance, by selecting an appropriate catalyst system, rapid curing may be achieved at high or low atmospheric humidity or at high or low oxygen content. The skilled worker is aware of these influences and will adjust the atmospheric conditions accordingly by means of appropriate optimization methods.

The invention further provides a process in which metal strips are coated with a polysilazane solution by the coil coating process.

The coil coating process is described in detail for example in Römpp Lexikon Lacke und Druckfarben, Georg Thieme Verlag, Stuttgart, 1998. Said item of literature is hereby explicitly incorporated by reference. The conduct and optimization of the process are familiar to the skilled worker. A more detailed exposition of this process will therefore not be undertaken in connection with the present invention.

Finally the invention provides the metal strips coated in accordance with the invention.

The polysilazane-based coating of the invention is applied by the usual coil coating process: in other words, application to the coil takes place alternatively via a roll, by spraying, or by coating in an immersion bath. Application may take place either to one side of the coil or to the face and reverse simultaneously. Thereafter the strips are passed on to a drying section.

Prior to application of the coating it is possible first of all to apply a primary coat, which may contribute to improving the adhesion of the polysilazane film to the metal strip. Typical primers are those based on silanes such as, for example, 3-aminopropyltriethoxysilane, 3-glycidyloxypropyltriethoxysilanes, 3-mercaptopropyltrimethoxysilanes, vinyltriethoxysilanes, 3-methacryloyloxypropyltrimethoxysilanes, N-(2-aminoethyl)-3-aminopropyltrimethoxysilanes, bis(3-triethoxysilylpropyl)amines, N-(n-butyl)-3-aminopropyltrimethoxysilanes, and N-(2-aminoethyl)-3-aminopropylmethyldimethoxysilanes.

Polysilazanes can be cured at high temperature in a very short time, thus ensuring sufficient curing in the drying section. Since polysilazanes enjoy great temperature stability, a higher curing temperature is possible than in the case of conventional coating systems, as well. The only limits on this temperature are generally those imposed by the thermal deformability of the metal strip.

Curing of the polysilazane coating in the coil coating process takes place preferably at an oven temperature of 150 to 500° C., preferably 180 to 350° C., more preferably 200 to 300° C. The drying time is usually 10 to 120 seconds, depending on the film thickness. In accordance with the thickness and nature of the metal strip and the construction of the drying section, a peak metal temperature (PMT) of 100 to 400° C. is attained here, preferably 150 to 300° C., more preferably 200 to 260° C. Besides curing by conventional drying it is also possible to use radiant dryers based on IR or NIR technology. In this case these dryers are operated in the wavelength range from 12 to 1.2 micrometers or 1.2 to 0.8 micrometers respectively. Typical radiation intensities are in the range from 5 to 1000 kW/m$^2$.

Coating with the polysilazane formulation may be followed by a further aftertreatment to adapt the surface energy of the coating. By this means it is possible to produce, alternatively, hydrophilic, hydrophobic or oleophobic surfaces, which influence the soiling tendency.

Metals used with preference for coating are, for example, aluminum, steel, galvanized steel, zinc, magnesium, titanium or alloys of these metals. The metals or metal strips may have been pretreated, by means for example of chromating, chromate-free pretreatment, anodizing or vapor deposition with metal oxide films.

With the polysilazane coating of the invention it is possible to obtain very good corrosion control, with a significantly thinner coat than in the case of conventional coil coating materials being sufficient. The cured polysilazane coating normally has a coat thickness of 0.1 to 10, preferably 0.5 to 5, more preferably 1 to 3 micrometers. The reduced level of material consumption achieved in this way is ecologically advantageous, since the amount of solvent used is reduced. Moreover, there is no need for an undercoat, since the thin polysilazane coat itself provides a sufficiently high protective effect.

In view of the organic nature of the coating it is extraordinarily resistant to UV and to weathering.

The coils coated in accordance with the invention can be used for any of a very wide variety of applications, in the construction sector for instance, in vehicle construction or in the manufacturing of household appliances. These may be, for example, ceiling or wall elements, window profiles, roller shutters, reflectors, bodywork components, or components of household appliances.

EXAMPLES

The perhydropolysilazanes used are products of Clariant Japan K.K. The solvent used is di-n-butyl ether (designation NL).

The solution contains (0.75% by weight) palladium propionate, relative to the perhydropolysilazane, as catalyst.

The curing conditions in the examples were chosen so as to be comparable with those in a coil coating installation.

In the examples below, parts and percentages are by weight.

Example 1

Coating an Aluminum Panel

An aluminum panel with a thickness of 0.5 mm is immersed into an immersion apparatus filled with a 20% strength perhydropolysilazane solution NL120A-20 (Clariant Japan) and withdrawn at a speed of 120 cm/min. Directly after coating, the panel is introduced into a forced-air drying oven preheated to a temperature of 250° C., and left there for 60 seconds. During this time a peak metal temperature (PMT) of 240° C. is attained. The result after cooling is a clear, transparent, and crack-free coating.

Example 2

Coating an Aluminum Panel

An aluminum panel with a thickness of 0.5 mm is immersed into an immersion apparatus filled with a 10% strength perhydropolysilazane solution NL120A-20 (Clariant Japan) and withdrawn at a speed of 120 cm/min. Directly after coating, the panel is introduced into a forced-air drying oven preheated to a temperature of 250° C., and left there for 30 seconds. During this time a peak metal temperature (PMT) of 240° C. is attained. The result after cooling is a clear, transparent, and crack-free coating.

Example 3

Coating an Eloxed Aluminum Panel

An eloxed aluminum panel with a thickness of 0.5 mm is immersed into an immersion apparatus filled with a 20% strength perhydropolysilazane solution NL120A-20 (Clariant Japan) and withdrawn at a speed of 120 cm/min. Directly after coating, the panel is introduced into a forced-air drying oven preheated to a temperature of 250° C., and left there for 60 seconds. During this time a peak metal temperature (PMT) of 240° C. is attained. The result after cooling is a clear, transparent, and crack-free coating.

Example 4

Coating a Surface-modified Aluminum Panel

An aluminum panel 0.5 mm thick, to whose surface a $TiO_2$ and $SiO_2$ oxide film has been applied beforehand, is immersed into an immersion apparatus filled with a 20% strength perhydropolysilazane solution NL120A-20 (Clariant Japan) and withdrawn at a speed of 120 cm/min. Directly after coating, the panel is introduced into a forced-air drying oven preheated to a temperature of 250° C., and left there for 60 seconds. During this time a peak metal temperature (PMT) of 240° C. is attained. The result after cooling is a clear, transparent, and crack-free coating.

Example 5

Surface-modified Aluminum Panel With IR Curing

An aluminum panel 0.5 mm thick, to whose surface a $TiO_2$ and $SiO_2$ oxide film has been applied beforehand, is immersed into an immersion apparatus filled with a 20% strength perhydropolysilazane solution NL120A-20 (Clariant Japan) and withdrawn at a speed of 120 cm/min. Directly after coating, the panel is irradiated from the underside in an IR dryer (tungsten lamps) for 50 seconds. A peak metal temperature (PMT) of 240° C. is attained in this time. The result after cooling is a clear, transparent, and crack-free coating.

Example 6

Coating a Zinc Panel

A zinc panel with a thickness of 0.8 mm is immersed into an immersion apparatus filled with a 10% strength perhydropolysilazane solution NL120A-20 (Clariant Japan) and withdrawn at a speed of 120 cm/min. Directly after coating, the panel is introduced into a forced-air drying oven preheated to a temperature of 260° C., and left there for 30 seconds. During this time a peak metal temperature (PMT) of 230° C. is attained. The result after cooling is a clear, transparent, and crack-free coating.

Example 7

Coating a Zinc Panel

A zinc panel with a thickness of 0.8 mm is immersed into an immersion apparatus filled with a 20% strength perhydropolysilazane solution NL120A-20 (Clariant Japan) and withdrawn at a speed of 120 cm/min. Directly after coating, the panel is introduced into a forced-air drying oven preheated to a temperature of 260° C., and left there for 60 seconds. During this time a peak metal temperature (PMT) of 240° C. is attained. The result after cooling is a clear, transparent, and crack-free coating.

Example 8

Coating a Zinc Panel

A zinc panel with a thickness of 0.8 mm is immersed into an immersion apparatus filled with a mixture of a 20% strength perhydropolysilazane solution NL120A-20 (Clariant Japan) and a 10% solution of a polymethylsilazane in petroleum spirit (prepared by the process described in Example 1 in U.S. Pat. No. 6,329,487) in a ratio of 2.83:1 and withdrawn at a speed of 120 cm/min. Directly after coating, the panel is introduced into a forced-air drying oven preheated to a temperature of 260° C., and left there for seconds. During this time a peak metal temperature (PMT) of 240° C. is attained. The result after cooling is a clear, transparent, and crack-free coating.

Example 9

Corrosion Test

The corrosion resistance of the coated zinc panels from Examples 6 to 8 is tested in a condensation-water alternating-atmosphere test (KFW) in accordance with ISO 6270-4. After an exposure time of 25 cycles the samples are evaluated. The results obtained are as follows:

| Example | Visual assessment |
| --- | --- |
| 6 | no white rust formed |
| 7 | no white rust formed |
| 8 | no white rust formed |
| zinc panel (uncoated) | severe white rust formation |

Example 10

Determination of Scratch Resistance

The scratch resistance is determined by multiple exposure (five back-and-forth rubs) with grade 00 steel wool at a force of 3N. The scratching is evaluated visually in accordance with the following scale: very good (no scratches), good (few scratches), satisfactory (significant scratches), adequate (severely scratched), and deficient (very severely scratched).

| Example | Scratch resistance |
| --- | --- |
| 1 | very good |
| 2 | good |
| 3 | good |
| 4 | good |
| 5 | good |
| 6 | good |
| 7 | very good |
| 8 | satisfactory |
| aluminum panel (uncoated) | deficient |
| zinc panel (uncoated) | adequate to deficient |

Example 11

Adhesive Strength

The adhesion of the coating is determined by a cross-cut test in accordance with DIN EN ISO 2409, adhesion occurring on a scale from 0 (best score) to 5 (worst score).

| Example | Adhesion |
| --- | --- |
| 1 | GT 0 |
| 2 | GT 0 |
| 3 | GT 0 |
| 4 | GT 0 |
| 5 | GT 0 |
| 6 | GT 0 |
| 7 | GT 0 |
| 8 | GT 0 |

The invention claimed is:

1. A process for continuously coating a metal or metal strip by the coil coating process; comprising the steps of applying a solution comprising a polysilazane or a mixture of polysilazanes of the formula (I)

$$-(SiR'R''-NR''')_n- \quad (1)$$

where R', R" and R'" are identical or different and independently of one another are hydrogen or an unsubstituted or substituted alkyl, aryl, or (trialkoxysilyl)alkyl radical, n being an integer such that the polysilazane or a mixture of polysilazanes has a number average molecular weight of 150 to 150,000 g/mole, in at least one solvent and at least one catalyst to the metal or metal strip to form a coating on the metal or metal strip and curing the coating on the metal and metal strip at a temperature of 150 to 500° C. by using IR or NIR radiation, further where the curing time is 10-120 seconds.

2. The process as claimed in claim 1, wherein prior to the coating step, the process further comprises pretreating the metal or metal strip by chromating, chromate-free pretreatment, anodizing or vapor deposition with metal oxide films.

3. A process for continuously coating a metal or metal strip by the coil coating process; comprising the steps of applying a solution comprising a polysilazane or a mixture of polysilazanes of the formula (I)

$$-(SiR'R''-NR''')_n- \quad (1)$$

where R', R" and R'" are identical or different and independently of one; another are hydrogen or an unsubstituted or substituted alkyl, aryl, or (Irialkoxysilyl)alkyl radical, n being an integer such that the polysilazane or a mixture of polysilazanes has a number average molecular weight of 150 to 150,000 g/mole, in at least one solvent and at least one catalyst to the metal or metal strip to form a coating on the metal or metal strip and curing the coating on the metal and metal strip at a temperature of 150 to 500° C. by using IR or NIR radiation, further where the curing time is for 10-120 seconds, wherein the metal or metal strip is zinc.

* * * * *